Sept. 30, 1952     C. JACOBSON     2,612,425
TOWEL FEEDING AND CUTTING MACHINE
Filed Dec. 23, 1949     3 Sheets—Sheet 2

INVENTOR.
CHARLES JACOBSON
BY
ATTORNEY

Sept. 30, 1952 C. JACOBSON 2,612,425
TOWEL FEEDING AND CUTTING MACHINE
Filed Dec. 23, 1949 3 Sheets-Sheet 3

INVENTOR.
CHARLES JACOBSON
BY
ATTORNEY

Patented Sept. 30, 1952

2,612,425

UNITED STATES PATENT OFFICE 2,612,425

TOWEL FEEDING AND CUTTING MACHINE

Charles Jacobson, Brooklyn, N. Y.

Application December 23, 1949, Serial No. 134,681

6 Claims. (Cl. 312—39)

This invention pertains to new and useful improvements in vending machines and more particularly to an improved machine for vending towels or the like.

More particularly, the present invention proposes an improved machine for vending towels characterized by a pair of feed rolls arranged to be manually operated for drawing the toweling material from a continuous supply in a manner to project it through a discharge slot formed in a casing which encloses the operating mechanism of the present invention.

Still further, the present invention proposes the provision of a manually movable handle for operating the feed rolls and arranged in a connection with a lock means which releasably holds the movable handle in its normal starting position.

Another object of the present invention proposes the provision of coin controlled mechanism for releasing the movable handle upon insertion of a coin of the proper value in a manner to be manually pivoted to project the toweling material.

A still further object of the present invention proposes the provision of cutting blades just behind the discharge slot of the casing in a manner to sever the toweling material when a piece of proper length has been extended through the discharge slot.

Still another object of the present invention proposes the arrangement of a novel driver gear arranged to be rotated by the movable handle when pivoted for turning the feed rolls during the first part of the movement of the handle after which rotation of said feed rolls is stopped and further movement of the handle and driver gear are utilized for operating the blades for severing the toweling material.

It is another object of the present invention to provide the bottom of the enclosing casing with a waste container with a waste opening below the discharge slot communication with the waste container in a manner so that the towels may be placed therein after having been used.

The present invention further proposes that the vending machine be constructed to draw the toweling material from a continuous roll thereof, or, in accordance with a modification of the present invention, to draw the toweling material from a stacked folded length thereof.

It is a further object of the present invention to construct a machine for vending towels which is simple and durable, which can be manufactured and sold at a reasonable cost and which is fool-proof in its operation.

For further comprehension of the invention, and of the objects and advantages thereof, reference will be had to the following description and accompanying drawings, and to the appended claims in which the various novel features of the invention are more particularly set forth.

In the accompanying drawings forming a material part of the present disclosure:

Fig. 4 is a horizontal sectional view, on a reduced scale, taken substantially on the line 4—4 of Fig. 3.

Fig. 7 is a perspective view of the brake mechanism, per se.

Fig. 8 is a front elevational view of the top portion of the towel dispensing mechanism constructed in accordance with a modification of the present invention and having a portion thereof broken away to reveal interior constructions.

Fig. 9 is a perspective view of the toweling material used in the form of the invention shown in Fig. 8 together with its supporting shelf and related mechanism.

Figure 1:
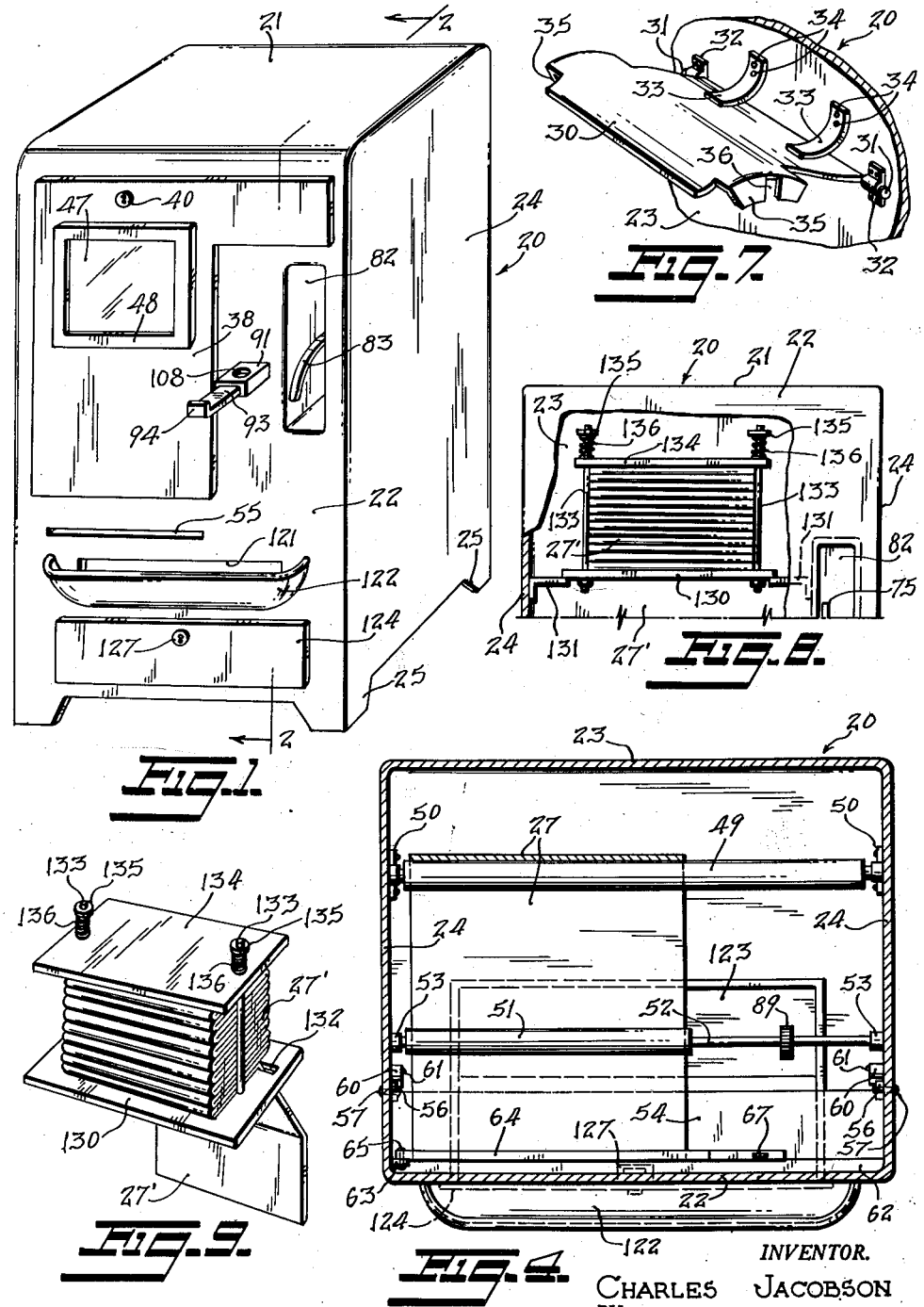
Fig. 1 is a perspective of the towel vending machine constructed in accordance with the present invention.

The vending machine for towels, according to the first form of the present invention illustrated in Figs. 1 to 7, includes a casing 20 having a top wall 21, a front wall 22, a back wall 23 and side walls 24. The casing 20 is formed of a relatively stiff sheet metal with the top wall 21, the front wall 22 and the back wall 23 bent from a single sheet of the metal. The side walls 24 are properly shaped and have their top, front and back edges welded or secured in any other similar manner to the adjacent edges of the top wall 21, the front wall 22 and the back wall 23. The bottom edges of the walls 22, 23 and 24, are formed with cutouts intermediate of their widths forming legs 25 upon which the casing 20 stands.

Extended laterally across the inside of the casing 20 there is a supply roller 26 upon which a continuous roll of toweling material 27 is mounted. The ends of the supply roller 26 are formed with reduced trunnions 28 rotatively engaged in U-shaped brackets 29 mounted on the inside faces of the side walls 24. Thus, the supply roller 26 can be lifted out of the brackets 29 when it is necessary to replace the roll of towel material.

Brake mechanism is arranged in connection with the continuous roll of toweling material 27 to retain the toweling material from being too rapidly unwound from the roll. The brake mechanism is comprised of an arcuate plate 30 which bears against the top of the roll of toweling material 27, see Figs. 2, 3 and 7. The plate 30 is pivotally supported at its rear edge by means of studs 31 which laterally extend from the sides of the plate 30 and which are turnably engaged in brackets 32 fixedly mounted on the back wall 23. Leaf springs 33 each have one of their ends secured to the back wall 23 above the rear edge of the arcuate plate 30 by means of rivets 34. The free ends of the leaf springs 33 bear against the top face of the plate 30 pressing it against the top of the roll of toweling material 27 to frictionally retain the roll against free movement on the supply roller 26.

Figures 2, 6:
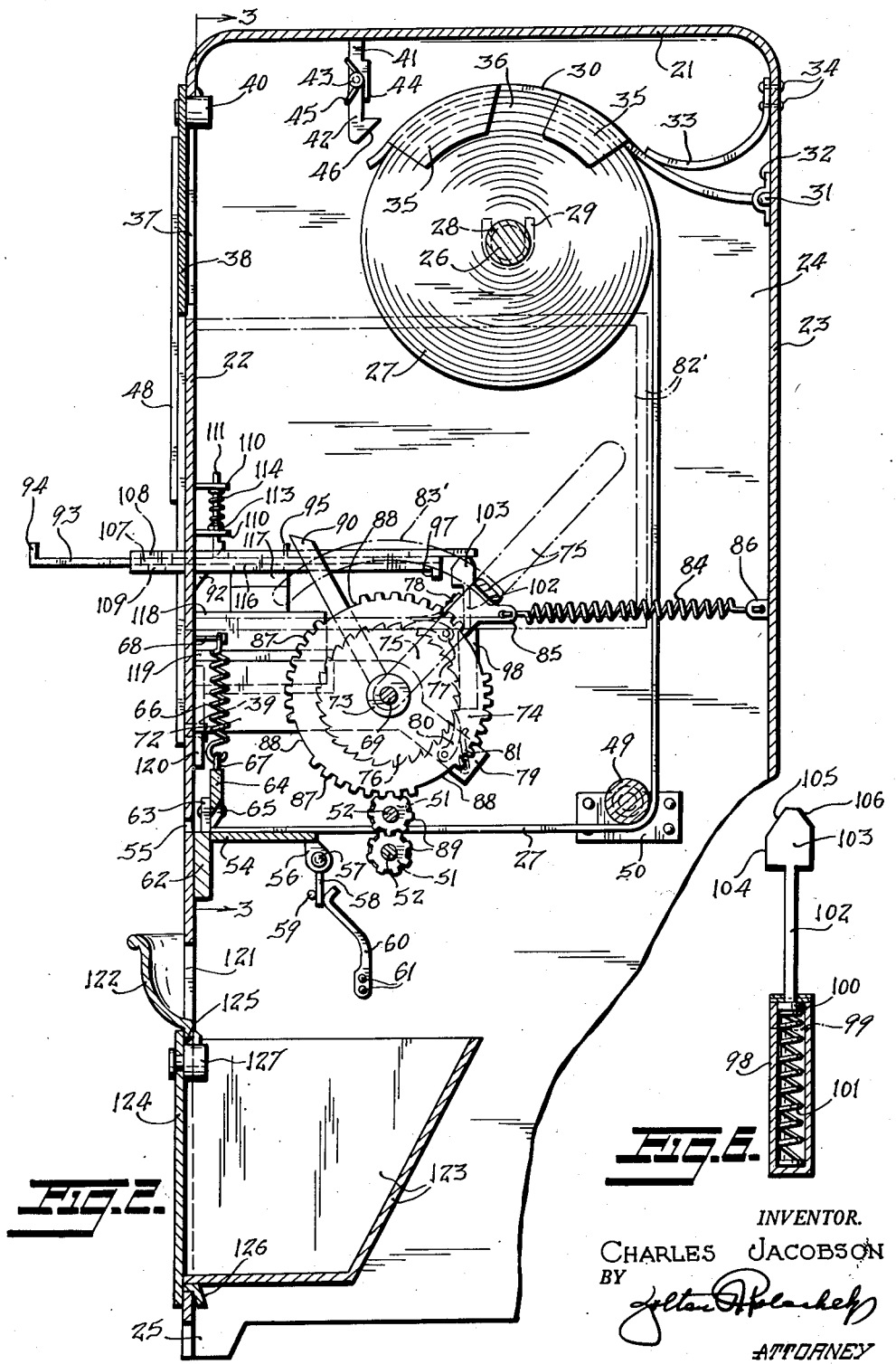
Fig. 2 is an enlarged vertical sectional view taken substantially on the line 2—2 of Fig. 1.
Fig. 6 is a vertical sectional view, on an enlarged scale, of the locking member carried by the operating arm and which engages the coin controlled mechanism.

The ends of the plate 30 are formed with flanges 35 which depend along the ends of the roll of toweling material 27 and retain the roll against longitudinal movement on the supply roller 26. As illustrated in Figs. 2 and 7, the flanges 35 are formed with arcuate cutouts 36, arranged concentric with the studs 31 to accommodate the projecting ends of the supply roller 26 as the roll of toweling material 27 becomes less and the plate 30 more closely approaches the supply roller 26.

The front wall 22 of the casing 20 in fore and aft alignment with the roll of toweling material 27 is formed with an enlarged opening 37. The expanse of the opening 37 is indicated by the dot and dash lines 37' on Fig. 3. The opening 37 is closed by a plate 38 provided at its bottom edge with a hook portion 39, see Fig. 2, which is engaged over the material of the front wall 22 at the bottom of the opening 37. The hook portion 39 is as wide as the bottom portion of the opening 37 so as to retain the cover plate 38 against lateral shifting. The top of the cover plate 38 is provided with the usual key operated lock 40 for releasably retaining the cover plate 38 in its position closing the front opening 37.

Figures 3, 5:
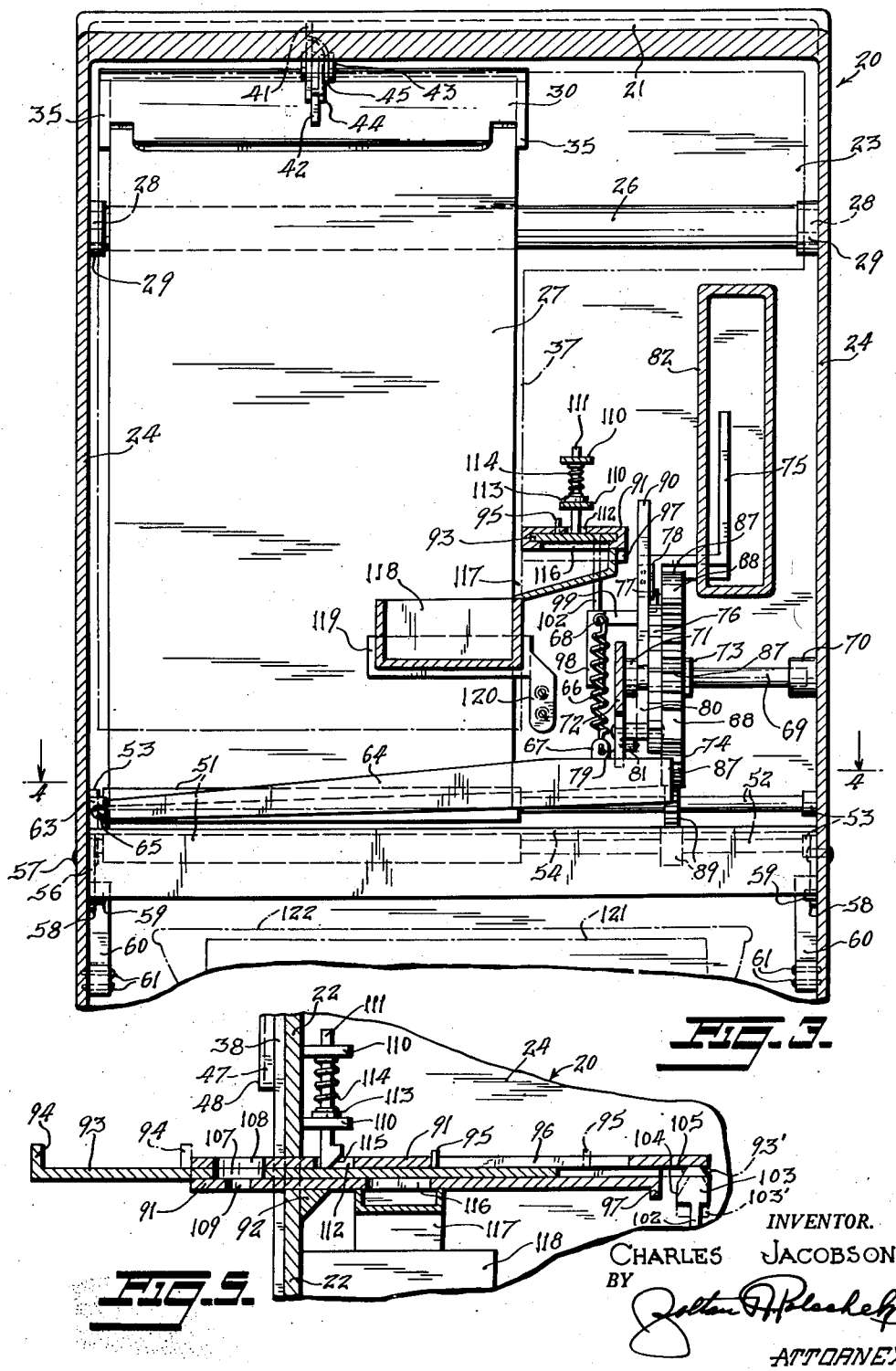
Fig. 3 is a partial vertical sectional view taken substantially on the line 3—3 of Fig. 2.
Fig. 5 is an enlarged central longitudinal sectional view of the coin controlled mechanism of the present invention.

From Figs. 1 and 2 and the dot and dash lines 37' in Fig. 3 designating the expanse of the opening 37, it will be noted that the top portion of the opening 37 and likewise the top portion of the plate 38 are enlarged laterally to the right to provide a clearance permitting removal of the supply roller 26 when a fresh roll of toweling material 27 is to be mounted on that roller.

The top wall 21 of the casing 20 is provided with a latch for retaining the brake plate 30 in an inoperative raised position during the time that the supply of toweling material 27 is being replenished on the supply roller 26. That latch is characterized by a lug 41, see Figs. 2 and 3, which depends from the top wall 21. A keeper member 42 is pivotally mounted upon the bottom of the lug 41 by means of a pivot pin 43. The lug 41 is formed with a stop member 44 which extends along the rear edge of the keeper member 42. A coil spring 45 is concentrically wound upon the pivot pin 43 and has one bearing against the front edge of the lug 41 and its other end bearing against the front edge of the keeper member 42 retaining the keeper member in an operative position abutted against the stop member 44. The bottom of the keeper member 42 is formed with a cam surface 46, see Fig. 2, so that when the plate 30 is raised off the roll of toweling material 27, the front edge of the plate will snap past the keeper member 42 to be engaged thereby and retained in the inoperative raised position. To release the plate 30 to again drop onto the top of the roll of toweling material 27, the keeper member 42 must be manually pivoted against the action of the coil spring 45 to disengage the front edge of the plate 30 from the keeper member 42.

The front face of the cover plate 38 below the lock 40, has mounted thereon a mirror 47 which is supported in a suitable frame 48 of metal attached to the cover plate 38.

The toweling material 27 passes from the supply roller 26 downward and beneath an idler roller 49 which has its ends rotatively supported in brackets 50 fixed to the side walls 24 of the casing 20. From the idler roller 49, the toweling material 27 passes between feed rollers 51 made of cork, rubber or other similar friction material. The feed rollers 51 are fixedly mounted on shafts 52 rotatively supported on brackets 53 mounted on the inside faces of the side walls 24. It is appreciated, of course, that, if desired, the idler roller 49 could be omitted entirely and the toweling material 27 could pass directly from the supply roller 26 to the feed rollers 51 without departing from the intent of the present invention.

After passing between the feed rollers 51, the end of the toweling material 27 passes across the top face of a guide plate 54 for guiding the end of the toweling material 27 through the discharge slot 55 formed in the front wall 22 of the casing 20, see particularly Figs. 1 and 2. The guide plate 54 is pivotally supported upon the side walls 24 of the casing 20 by means of depending lugs 56 pivotally supported by pivot pins 57. Each of the lugs 56 is formed with a downward extension 58 urged against a stop member 59, projecting from the respective side wall 24 by means of a leaf spring 60 secured to the respective side wall 24 by means of rivets 61. When the downward extensions 58 are engaged against the stop members 59, the guide plate 54 will be disposed with its top face flush with the bottom of the discharge slot 55, as shown in Fig. 2.

Interposed between the front end of the guide plate 54 and the front wall 22 of the casing 20, there is means for cutting of a predetermined length of the toweling material 27 after having been extended through the discharge slot 55. That cutting means is characterized by a fixedly mounted blade 62 on the inside face of the front wall 22 with its top edge flush with the top face of the guide plate 54 when the guide plate is in the normal position shown in Fig. 2. At one end, the fixed blade 62 is formed with an upwardly extended lug 63, see Figs. 2 and 4. A movable blade 64 is pivotally attached at one end to the lug 63 by means of a pivot pin 65. Attached to the other end of the movable blade 64 there is a contraction spring 66 for holding the movable blade 64 in the raised inoperative position shown in Figs. 2 and 3. The bottom end of the spring 66 is looped through a lug 67 extended upward from the said other end of the movable blade 64 and has its upper end engaged over a pin 68 extended inward from the inner face of the front wall 22. The spring 66 in the position shown in Figs. 2 and 3, is under no tension.

When the movable blade 64 is pivoted downward by a means to be hereinafter described, it will cut off the end of the toweling material 27 which has been extended through the discharge slot 55. For that purpose, the guide plate 54 has been pivotally mounted so that its front edge will move downward beneath the advancing beveled cutting edge of the movable blade 64. Such movement of the guide plate 54 will load the leaf springs 60, the extensions 58 moving away from the stop member 59, to return the guide plate to the normal position shown in Fig. 2 when the movable blade 64 is returned to its raised position. From Fig. 2 it will be noted that the rear edge of the guide plate 54 is positioned directly over the center of the pivot pins 57 so that when the guide plate 54 is pivoted downward it will have no lifting effect on the toweling material 27. Thus, there will be no lengthening of the stretch of toweling material 27 located between the feed rollers 51, which will be idle during the cutting of the toweling material 27, and the cutting blades 62 and 64.

Manually operable means is provided for turning the feed rollers 51 and for pivoting the movable blade 64 toward the fixed blade 62 in timed synchronism to first extend a length of the toweling material 27 through the discharge slot 55 and to then cut that length off. The manually operable means comprises a short shaft 69 mounted between a bearing 70 mounted on the inside face of one of the side walls 24 and a second bearing 71 mounted on a bracket 72 extended inward from the inside face of the front wall 22. Rotatively positioned on the shaft 69 between the bearing 71 and a fixedly mounted collar 73 on the shaft, there is a driver gear 74 and a radially extended handle 75. On its side adjacent the handle 75, the driver gear 74 is formed with an integral ratchet wheel 76. The handle 75 carries a pivotally mounted pawl 77, see particularly Fig. 2, which is urged toward the ratchet wheel 76 by a spring 78 also mounted on the handle 75 so that when the handle 75 is pulled forward the driver gear 74 and the ratchet wheel 76 will be rotated in a counterclockwise direction as viewed in Fig. 2. On return movement of the handle 75, the pawl 77 will merely idle over the teeth of the ratchet wheel 76. To retain the driver gear 74 against clockwise rotation on the return movement of the handle 75, the bracket 72 is formed with a downward extension 79 upon which a second pawl 80 is pivotally mounted. That second pawl 80 is urged into engagement with the teeth of the ratchet wheel 76 by a leaf spring 81, see Fig. 2.

The front wall 22 of the casing 20 is formed with a recessed portion 82 (indicated by dot and dash lines 82' in Fig. 2) with the innermost wall thereof formed with an arcuate slot 83 (indicated by dot and dash lines 83' in Fig. 2) arranged concentric with the pivot of the handle 75. Intermediate of its ends, the handle 75 is angled, see Fig. 3, to extend through the arcuate slot 83 so that the top portion of the handle will be exposed within the recessed portion 82 to be manually grasped and pulled forward. The arcuate slot 83 is of a length to limit movement of the top portion of the handle 75 through an arc sufficient to turn the driver gear 74 through one-quarter of a turn for each forward movement of the handle 75. The handle 75 is retained in its normal position, against the back end of the arcuate slot 83, by a contraction spring 84 which operates between a lug 85 extended rearward from the handle 75 and a lug 86 extended forward from the back wall 23.

From Fig. 2 it will be noted that the periphery of the driver gear 74 is divided into four sections of equal length each comprised of a toothed section 87 and an untoothed section 88—the toothed sections 87 being somewhat longer than the untoothed sections 88. The driver gear 74 in turn meshes with the upper one of a pair of superimposed intermeshed pinions 89 carried by the shafts 52 upon which the feed rollers 51 are mounted. Thus, on each quarter turn of the driver gear 74, by forward movement of the handle 75, the tooth portions 87 of the driver gear 74 will cause the pinions 89 to be turned to turn the feed rollers 51 and advance toweling material 27 through the discharge slot 55. During the latter part of each quarter turn, the topmost pinion 89 will be in an untoothed section 88 of the driver gear 74 and the pinions 89 will not be rotated.

It is during the time that the pinions 89 are idle—during the latter part of each quarter turn of the driver gear 74—that the movable blade 64 is pivoted toward the fixed blade 62 for cutting off that portion of the toweling material 27 which has been extended through the discharge slot 55. Movement of the movable blade 64 is accomplished by an arm 90 which extends radially from the pivoted end of the handle 75. The arm 90 is of a length and located to engage the top of the movable blade 64 just as the topmost pinion 89 enters one of the untoothed sections 88 and pivot that blade 64 completely downward against the action of the spring 66 to cut off the extended toweling material 27 during the latter part of each quarter turn of the driver gear 74.

Coin operated means is provided for retaining the handle 75 against being pulled forward until such time as the coin of proper value has been inserted into the machine. The coin operated means is characterized by a tubular member 91 of flattened rectangular shape mounted through the front wall 22 of the casing 20. The mounting of the tubular member 91 is reinforced by a triangularly shaped block 92 mounted between the bottom face of the tubular member and the inside face of the front wall 22. A slide member 93 is slidably positioned in the tubular member 91 with its front end normally extended from the front end of the tubular member 91, as shown in Figs. 2 and 5. The front end of the slide member 93 has an upturned portion 94 providing a grip for sliding the slide member 93 relative to the tubular member 91 and for limiting inward movement of the slide member 93 by striking the front end of the tubular member 91. Forward movement of the slide member 93 with relation to the tubular member 91 is arrested by an upwardly extended peg 95 on the slide member 93 which engages a complementary elongated slot 96, see Fig. 5, formed in the top wall of the tubular member 91.

As clearly shown in Figs. 2 and 5, the rear end of the top wall of the tubular member 91 is extended a considerable distance beyond the rear end of the bottom wall of the tubular member and that bottom wall is formed at its rear end with a downwardly extended keeper lip 97. Mounted on the side of the handle 75, within the casing 20, there is a latch means arranged to engage the keeper lip 97 and retain the handle 75 against being pulled forward. The latch means is comprised of a tubular casing 98 fixedly mounted on the outer end of a laterally extending projection 99 of the handle 75. Specific details of the latch means are clearly shown in Fig. 6, from which it will be noted that a piston 100 is slidably disposed within the tubular casing 98 and urged upward by a coiled expansion spring 101. The top wall of the casing 98 is formed with an aperture and a stem 102 integral with the piston 100 has its free end slidably extended through the aperture and has an enlarged head 103 formed on its upper end. The front of the head 103 is characterized by a vertical wall portion 104 and an inclined cam surface 105 at the top end of the vertical wall portion 104. Normally, the top of the head 103 bears against that portion of the top wall of the tubular member 91 which extends rearward beyond the bottom wall thereof so that if an attempt is made to pivot the handle 75 forward without inserting a coin of the proper value, the vertical wall portion 104 of the head 103 will strike the keeper lip 97 and hold the handle 75 against forward movement, see particularly Figs. 2 and 5 in that respect. The back edge of the head 103 is formed at the top thereof with a cam surface 106 for guiding the head beneath the keeper lip 97 on the return or back movement of the handle 75.

With the slide member 93 in its full forward position, the slide member 93 and the top wall of the tubular member 91, forward of the front well 22, have aligned coin holes 107 and 108 respectively, into which a coin of the proper denomination can be placed. The bottom wall of the tubular member 91 is formed with a smaller hole 109 into which a pin or the like can be engaged to lift an inserted coin out of the aligned holes 107 and 108, if desired. In constructing the coin operated means, it is essential that the slide member 93 be formed of a piece of metal having a thickness corresponding to the thickness of the coin which is to be used for operating the device, so that the top face of the coin will be flush with the top face of the slide member 93 when the coin is located in the hole 107.

Arranged in construction with the slide member 93 there is means for retaining the slide member 93 from being pushed inward when there is no coin in the hole 107. The retaining means is characterized by a pair of superimposed lugs 110 extended rearward from the inside face of the front wall 22 and over the tubular member 91. A plunger 111 is slidably disposed in aligned apertures formed in the lugs 110 and the plunger 111 and the apertures of corresponding irregular shape to retain the plunger 111 against rotation while at the same time permitting free vertical sliding movements of the plunger 111. The bottom of the plunger 111 is extended into an aperture 112 formed in the top wall of the tubular member 91 to rest on the top face of the slide member 93. A collar 113 is fixedly mounted on the plunger 111 between the lugs 110 and a spring 114 coaxially wound on the plunger 111 operates between the top face of the collar 113 and the bottom face of the topmost lug 110 resiliently forcing the plunger 111 downward.

Should an attempt be made to push the slide member 93 inward without a coin in the hole 107, the spring 114 will function to snap the bottom of the plunger 111 into the hole 107 as it passes beneath the plunger. In the lowered position of the plunger 111, the front edge thereof will be engaged by the material of the slide member 93 defining the front of the hole 107 arresting inward movement of the slide member 93 in a position in which the rear end of the slide member will not quite have reached the head 103 of the handle latch means. The rear edge of the bottom of the plunger 111 is formed with a cam surface 115 to be engaged by the material of the slide member 93 defining the back of the hole 107 to lift the plunger 111 out of that hole against the action of the spring 114 upon outward movement of the slide member 93 so that the plunger 111 will be ineffective to stop such outward movement.

However, when a coin of the proper denomination is in position in the hole 107, that coin will retain the plunger 111 in its raised position as the coin passes beneath the plunger permitting the slide member 93 to be pushed fully inward as indicated by the dot and dash lines 93′ in Fig. 5. As the slide member 93 approached its fully in position, the rear end of the same will have engaged the cam surface 105 of the head 103 and push the head downward and retain it in its downward position by reason of the fact that the rear end of the slide member becomes disposed between the head and the bottom face of the top wall of the tubular member 91. The new position of the head 103 is indicated by the dot and dash lines 103′ in Fig. 5. In the downward position of the head 103, the top end of the vertical wall portion 104 becomes disposed below the bottom edge of the keeper lip 97 bringing the cam surface 105 into position to engage the keeper lip 97 as the handle 75 is pivoted forward. As that cam surface 105 engages the keeper lip 97, on forward pivoting of the handle 75, the cam surface will function to guide the head 103 beneath the keeper lip, against the action of the spring 101 freeing the handle 75 to be pivoted completely forward. It is appreciated that the pivoting of the handle 75 must be started with the slide 93 in its fully pushed in position. On return movement of the handle 75 under impetus of the spring 84, the head 103 will be guided beneath the keeper lip 97 by the cam surface 106 on the back edge of the head 103.

In the fully in position of the slide member 93, its coin hole 107 becomes aligned with an enlarged coin discharge hole 116, see Figs. 3 and 5, formed in the bottom wall of the tubular member 91. In that position, the inserted coin drops through the discharge hole 116 and onto an inclined chute 117 which conveys the coin laterally and drops it into a coin collecting box 118. The collecting box 118 is removably positioned on a platform 119 mounted within the casing 20 behind the cover plate 38. Thus, when the cover plate 38 is removed the coin box 118 can be lifted out of the casing 20 to have its contents spilled therefrom. The platform 119 is mounted in position by means of a downwardly extended lug 120 secured to the inside face of the front wall 22 along side the opening 37 in that front wall 22.

The bottom portion of the front wall of the casing 20, below the discharge slot 55, is formed with an opening 121 through which used towels can be inserted into the bottom of the casing. The opening 121 is surrounded on the outer face of the front wall 22 by a chute 122 for guiding the used towels through that opening 121. Within the bottom of the casing 20, there is a container 123 into which the used towels collect after being passed through the opening 121.

The container 123 is integral with a plate 124 which closes a hole 125 formed in the front wall 22 below the opening 121. The plate 124 is retained in position by a hook portion 126 mounted on the bottom of the plate 124 and engaged with the material of the front wall 22 at the bottom of the hole 125. The hook portion 126 is as long as the hole 125 is wide to retain the plate 124 against lateral shifting. Mounted on the top of the plate 124 there is a key operated lock 127 which engages the material of the front wall 22 at the top of the hole 125. The lock 127 may be designed to be opened by the same key which opens the lock 40 or, if desired, the key operated lock 127 could be replaced by the usual spring operated latch member for retaining the top portion of the plate 124 in its position closing the hole 125.

It is thought that the operation of the coin controlled device of the present invention for dispensing a piece of towel material for the insertion of a coin of a given denomination will be apparent from the foregoing description of the mechanical construction without a detailed operation.

In the modification of the present invention shown in Figs. 8 and 9, the construction of the towel dispensing device is similar to that previously described except for the nature of the towel material and the support therefor. In the modification of the invention, the toweling material 27' is of the plurally folded type and is rested on a shelf 130 rested upon L-shaped brackets 131 secured to the inside face of one of the side walls 24 and the adjacent wall of the recessed portion 82 of the front wall 22. Adjacent its rear edge the shelf 130 is formed with an elongated slot 132 through which the toweling material 27' is continuously pulled by the feed rollers.

Resilient means is provided for retaining the toweling material 27' in position on the top face of the shelf 130. The resilient means is characterized by a pair of posts 133 which extend vertically from the shelf 130 on opposite sides of the stacked toweling material 27'. Slidably positioned on the top ends of the posts 133 to rest on the top of the stack of toweling material 27', there is a plate 134. The top ends of the posts 133 are threaded and nuts 135 are threadedly engaged upon the top ends of those posts 133. Expansion springs 136 are engaged coaxially upon the top ends of the rods 133 and operate between the adjacent faces of the plate 134 and the bottom faces of the nuts 135 for pressing the plate 134 downward onto the stack of folded toweling material 27'. Instead of the contraction spring 136 any other desired form of resilient means can be used for pressing the plate 134 downward onto the top of the stack of folded toweling material 27'.

In other respects the form of the invention shown in Figs. 8 and 9 is similar to that described in connection with Figs. 1 to 7 and like reference numerals are used to identify like parts in each of the several views.

In accordance with the terms of the present invention, the term "toweling material" is intended to cover any liquid absorbent material, whether made from paper, textile or any other similar material, suitable for absorbing water and like as generally used for drying the human hands and face following washing thereof.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a towel dispensing machine of the class described, means for holding a supply of toweling material, coacting feed rollers for feeding said toweling material from said supply, a manually operable handle for controlling the operation of said feed rollers, and means operated by said handle for cutting off the length of toweling material extended by said feed rollers, said feed rollers being connected for unitary movement by intermeshed pinions, a driver gear engaged with one of said pinions, and means interconnecting said handle and said driver gear for causing the driver gear to be turned through a portion of a complete revolution for each operation of the handle, the periphery of said driver gear being sub-divided into separate operating portions each having a toothed section and an untoothed section, said toothed sections of said driver gear being longer than said untoothed sections so that the feed rollers will be idle during the latter part of each of said portions of a complete revolution of said driver gear, said cutting off means comprising blades located on opposite sides of the toweling material after leaving said feed rollers, one of said blades being pivotally mounted, and an arm extending from said handle and operative during that part of each portion of a complete revolution of said driver gear when said feed rollers are idle to pivot the pivotally mounted blade and cut off the extended end of said toweling material.

2. The combination of claim 1 wherein said toweling material includes a shelf therefor, said toweling material being of the plurally folded type and rested on said shelf, said shelf being formed with an elongate slot through which said toweling material can be continuously drawn by said feed rollers.

3. The combination of claim 2, wherein resilient means for holding said folded toweling material in position engages said toweling.

4. The combination of claim 1 and a supply roller for said toweling material, said toweling being in a continuous roll and supported on said supply roller.

5. The combination of claim 1 wherein said blades are secured to tension means, a stationary blade, a shaft engaging said blades, and said driver gear actuating said blades.

6. The combination of claim 1 wherein said machine includes a guide plate adjacent said rollers, said guide plate being pivotally mounted and actuated by said blades to move out of the way when a piece of toweling is cut off.

CHARLES JACOBSON.

REFERENCES CITED

The following references are of record in the file of this patent:

UNITED STATES PATENTS

| Number | Name | Date |
| --- | --- | --- |
| 271,835 | Gilbert | Feb. 6, 1883 |
| 574,780 | Britton | Jan. 5, 1897 |
| 856,719 | Nagle | June 11, 1907 |
| 950,039 | Bradley | Feb. 22, 1910 |
| 1,058,101 | Richards | Apr. 8, 1913 |
| 1,703,938 | Johnson | Mar. 5, 1929 |
| 1,738,721 | Morin | Dec. 10, 1929 |
| 1,894,379 | Link | Jan. 17, 1933 |
| 1,933,840 | Bolen | Nov. 7, 1933 |
| 1,938,980 | Silberman | Dec. 12, 1933 |